United States Patent

Kitsutaka et al.

Patent Number: 5,805,306
Date of Patent: Sep. 8, 1998

[54] IMAGE READING APPARATUS

[75] Inventors: Eiji Kitsutaka, Fukuoka; Jun Hasegawa, Onojo, both of Japan

[73] Assignee: Matsushita Electric Industrial Co., Ltd., Osaka, Japan

[21] Appl. No.: 681,089

[22] Filed: Jul. 22, 1996

Related U.S. Application Data

[63] Continuation of Ser. No. 201,244, Feb. 24, 1994.

[30] Foreign Application Priority Data

Feb. 24, 1993 [JP] Japan .................... 5-035095

[51] Int. Cl.$^6$ ..................................... H04N 1/40
[52] U.S. Cl. ..................... 358/471; 358/474; 358/488
[58] Field of Search .................. 358/471, 474, 358/488; H04N 1/40

[56] References Cited

U.S. PATENT DOCUMENTS

| | | | |
|---|---|---|---|
| 4,533,959 | 8/1985 | Sakurai | 358/452 |
| 4,686,577 | 8/1987 | Arimoto | 358/488 |
| 4,953,230 | 8/1990 | Kurose | 358/488 |
| 5,172,422 | 12/1992 | Tan | 358/488 |
| 5,191,438 | 3/1993 | Katsurada et al. | 358/488 |
| 5,373,371 | 12/1994 | Masui | 358/488 |

FOREIGN PATENT DOCUMENTS 0154871  12/1980  Japan .................... 358/488

Primary Examiner—Thomas L. Stoll
Attorney, Agent, or Firm—Ratner & Prestia

[57] ABSTRACT

An image reading apparatus for approximately obtaining an image signal which might have been obtained if scanned in a second direction using an image signal obtained by scanning in a first direction. The image apparatus includes a conveyer for conveying a document, a detector for detecting the inclination of the conveyed document, and a window generator for generating a window signal. Also included is an image reader for reading an image by scanning the document in a first direction at a width broader than the width of the document and reading the scanned image only when the window signal is present to produce an issuing image signal. Also included is a first corrector for adjusting the start timing of the window signal so that the window signal may be started when the scanning passes through the beginning end of the document by reference to the inclination angle of the document. Also included is a second corrector for dividing the image signal of each sweep for the first direction after the first correction into a plurality of image signal blocks linking a plurality of the image signal blocks and approximate image signal which might have been obtained if scanned in the second direction.

6 Claims, 10 Drawing Sheets

1st DIRECTION →

IMAGE READING APPARATUS

This application is a continuation of application Ser. No. 08/201,244 filed Feb. 24, 1994.

BACKGROUND OF THE INVENTION (1) Field of the Invention

The present invention relates to an apparatus for correctly reading an image on a document conveyed at an inclination to the conveying direction.

(2) Description of the Related Art

In an image reading apparatus such as image scanner and facsimile apparatus, the document is conveyed by a conveying mechanism, while the line image sensor such as CCD sensor reads the image provided at a specific position on the document.

When the line image sensor is installed so as to read the direction orthogonal to the conveying direction, if the longitudinal direction of the document coincides with the conveying direction, the line image sensor will correctly read the lateral direction of the document. However, if the document is inclined to the conveying direction, the scanning direction of the line image sensor is inclined to the lateral direction of the document, and hence the line image sensor does not read the lateral direction of the document correctly.

In this case, hitherto, a correct image was obtained by storing the inclined image read by the line image sensor, and rotating and processing the stored image. It takes, however, a long time to rotate and process the image composing one page of a document, and it is unsuited to the recent request for high speed reading.

The invention presents an apparatus capable of reading an image on a document conveyed at an inclination to the conveying direction correctly and at high speed to meet the recent request.

SUMMARY OF THE INVENTION

The image reading apparatus of the invention is for approximately obtaining an image signal which might have been obtained if scanned in a second direction (the lateral direction of a document in this case), by using an image signal obtained by scanning in a first direction (the direction orthogonal to the conveying direction in this case), and comprises:

means for conveying a document, means for detecting the inclination of a conveyed document, means for generating a window signal, means for reading an image, by scanning the document in the first direction by a scanning width broader than the width of the document, and reading the scanned image only when the window signal is present, thereby issuing an image signal, first correcting means for adjusting the start timing of the window signal so that the window signal may be started when the scanning passes through the beginning end of the document, by reference to the inclination angle of the document, and second correcting means for dividing the image signal of each sweep for the first direction after the first correction into a plurality of image signal blocks, linking a plurality of the image signal blocks, and approximating the image signal which might have been obtained if scanned in the second direction.

DETAILED DESCRIPTION OF THE INVENTION

Figure 1:
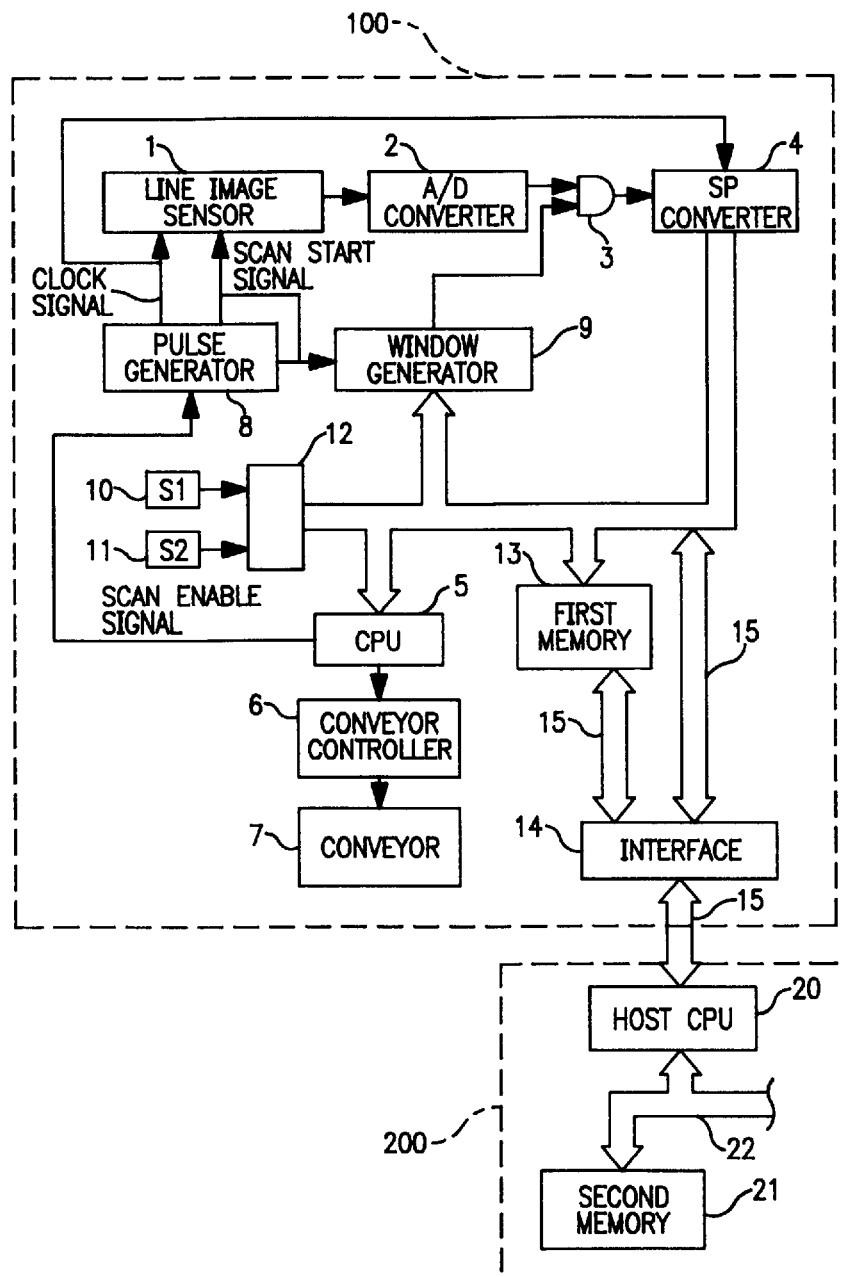
FIG. 1 shows the constitution of an image reading apparatus of the invention.
Figure 2:
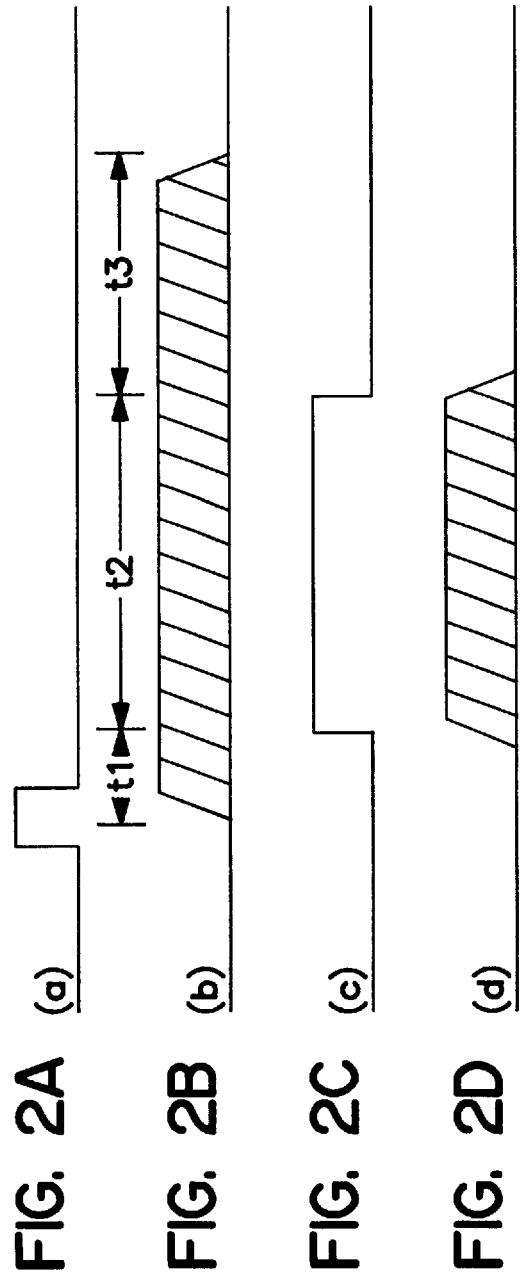
FIG. 2A–D are timing charts which are useful for explaining operation of the present invention.
Figure 3:
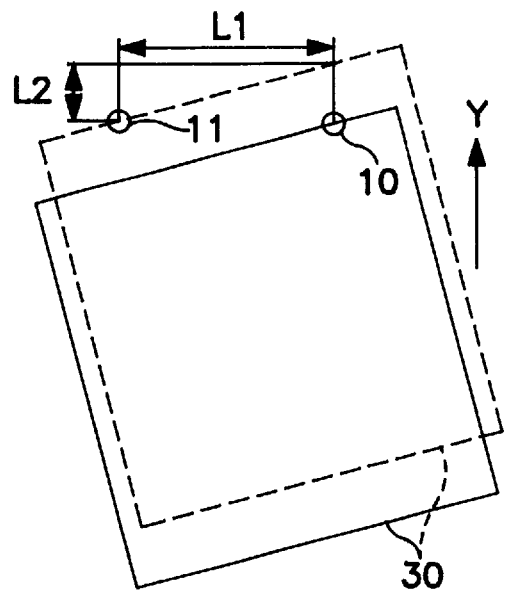
FIG. 3–5 are diagrams which are useful for explaining image reading.

FIG. 1 shows an embodiment of the invention. In an image scanner 100, a line image sensor 1 scans over a document, and issues an image signal. An A/D converter 2 converts the analog signal delivered from the line image sensor 1 into a digital signal. The serial signal put out from an AND element 3 is converted into a parallel signal in an S/P converter 4. A CPU 5 controls the operation of the image scanner 100. A conveyor controller 6 controls a conveyor 7. A pulse generator 8 receives a scanning enable signal from the CPU 5, and generates a clock signal of which one pulse corresponds to one pixel. The pulse generator 8 also sends a scanning start signal to the line image sensor 1 and a window generator 9. The image signal issued by the A/D converter 2 passes through the AND element 3 only while the window signal issued by the window generator 9 is present. That is, as shown in FIGS. 2A–D:

(a) The pulse generator 8 generates a scanning start signal.

(b) The line image sensor 1 starts scanning, and scans the document in a direction orthogonal to the conveying direction, and as a result the A/D converter 2 issues an image signal. Since the scanning width of the line image sensor 1 is broader than the document width, the image signal issued by the A/D converter 2 includes an image signal t2 showing an image on the document, and image signals t1 and t3 showing images outside the document.

(c) The window generator 9 issues a window signal which possesses a period coinciding with the image signal t2 showing the image on the document.

(d) The image signal t2 passes through the AND element 3.

Thus, the image reading apparatus of the invention, supposing the direction orthogonal to the conveying direction to be a first direction, possesses image reading means for scanning the document in a scanning width broader than the document width in the first direction, reading the scanned image only while the window signal is present, and issuing an image signal.

Back to FIG. 1, a first inclination sensor 10 and a second inclination sensor 11 are installed in the conveyor 7 apart a distance L1 in the direction orthogonal to the conveying direction Y of the document 30. Since the document 30 is inclined to the left, the second inclination sensor 11 detects the document 30 T sec later than the first inclination sensor 10. Since the conveying speed of the document 30 is constant, the distance L2 is measured by counting T sec. so that the inclination L2/L1 of the document 30 may be known.

In this embodiment, the inclination of the document 30 is normalized as follows.

$$L2/L1 = 1/(\text{int}(L1/L2)) = 1(\text{dot})/N(\text{line})$$

where N is an integer.

Figure 4:
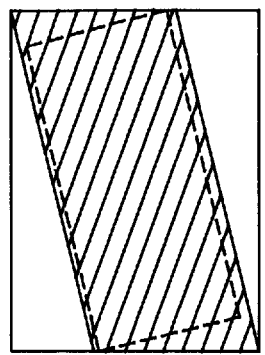
Figure 5:
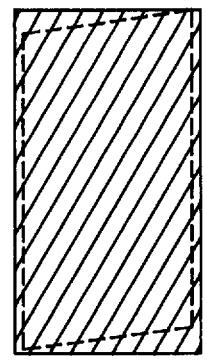

Returning again to FIG. 1, as explained below, an image signal corrected by first correction is written in a first memory 13. In a second memory 21 incorporated in an information processor 200, on the other hand, an image signal corrected by second correction is written. The rectangle shown in FIG. 4 is the region of scanning the document inclined to the left indicated by broken line, in the first direction by the line image sensor 1. The image signal in the rectangular shaded area is obtained. This image signal is corrected by first correction, converted into an image signal shown in FIG. 5, and is written into the first memory 13.

Figures 6A, 6B:
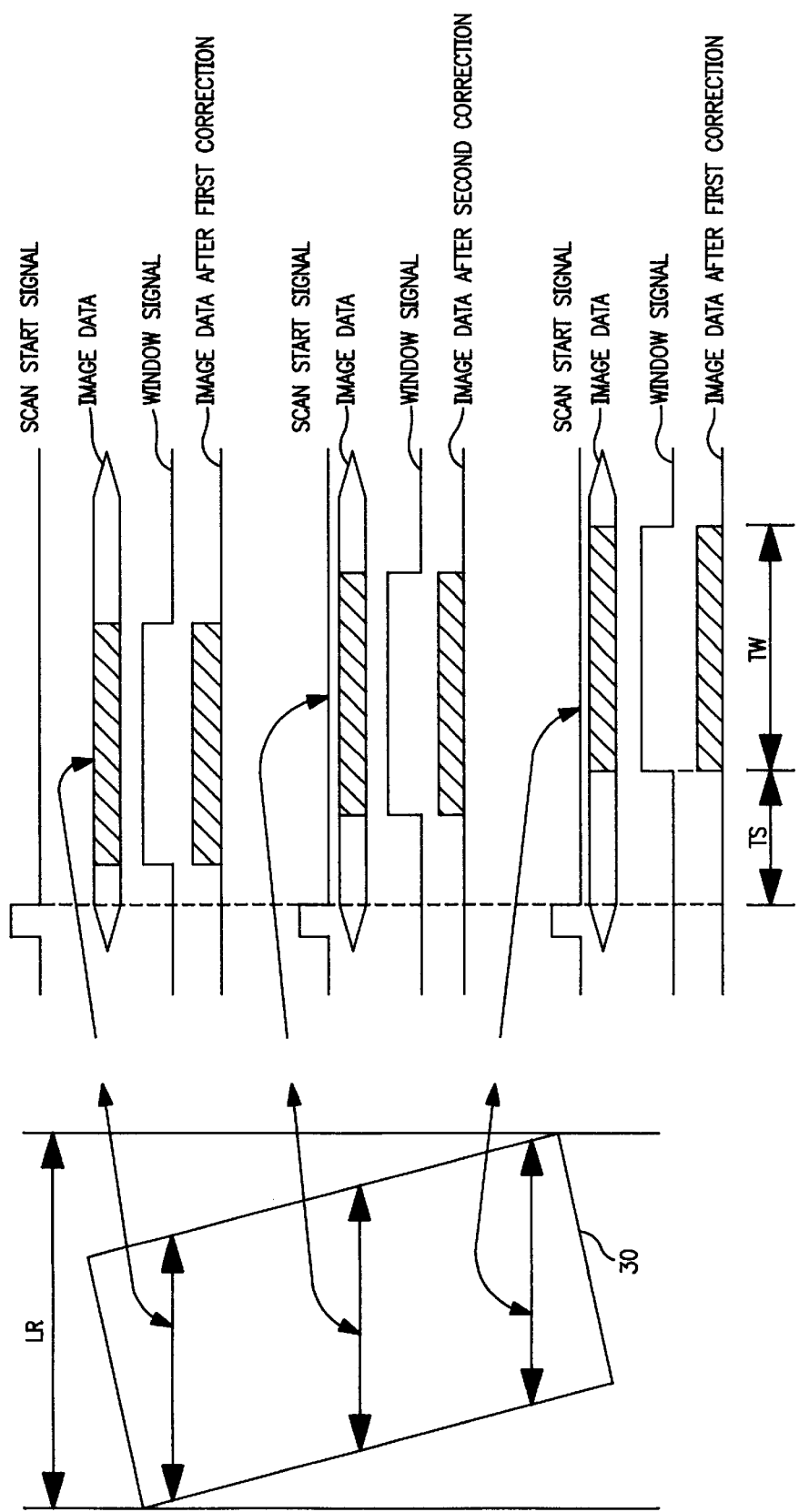
FIG. 6A is a diagram which is useful for explaining image correction.
FIG. 6B includes a plurality of timing charts which relate to the image correction illustrated by FIG. 6A.
Figure 7:
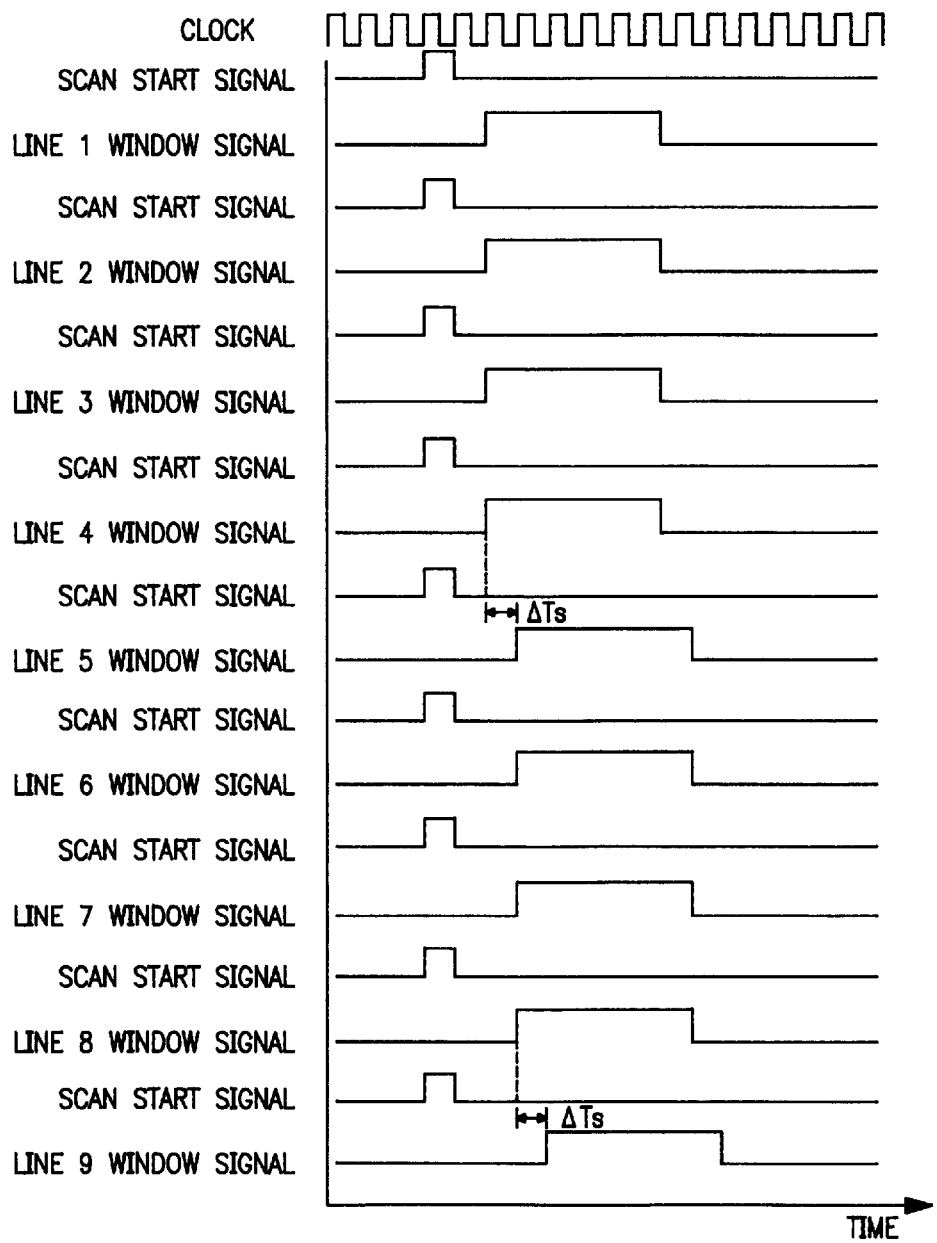
FIGS. 7 and 8 are timing charts which are useful for explaining first correction.

FIGS. 6A–B illustrate a first correction. LR denotes the scanning width of the line image sensor 1. TW is the window time when the window signal is active, which is determined relatively to the width of the document 30. TS is the window waiting period from the scanning start signal until the window signal is started, and it is a specific constant time corresponding to the document size while the document is not inclined, but when the document is inclined. It varies as shown in FIG. 7, depending on the inclination angle and the conveying distance of the document 30. More specifically, the first correction is done by adjusting the start timing of the window signal by reference to the inclination angle of the document so that the window signal may be started when scanning passes the top of the document. In other words, the first correction is the adjustment to match the top of the image signal of each scanning with the top of the document.

Figure 8:
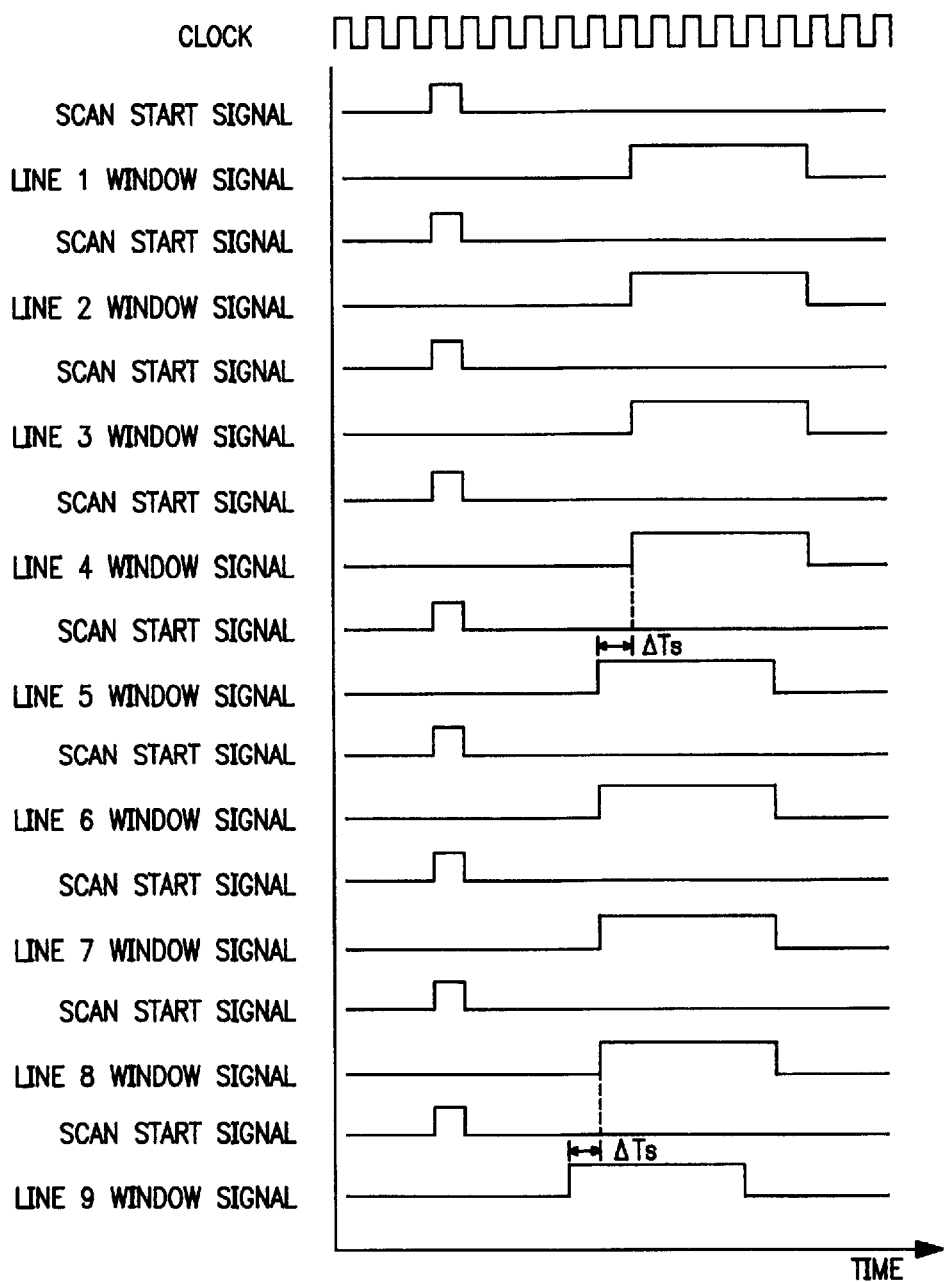
Figure 9:
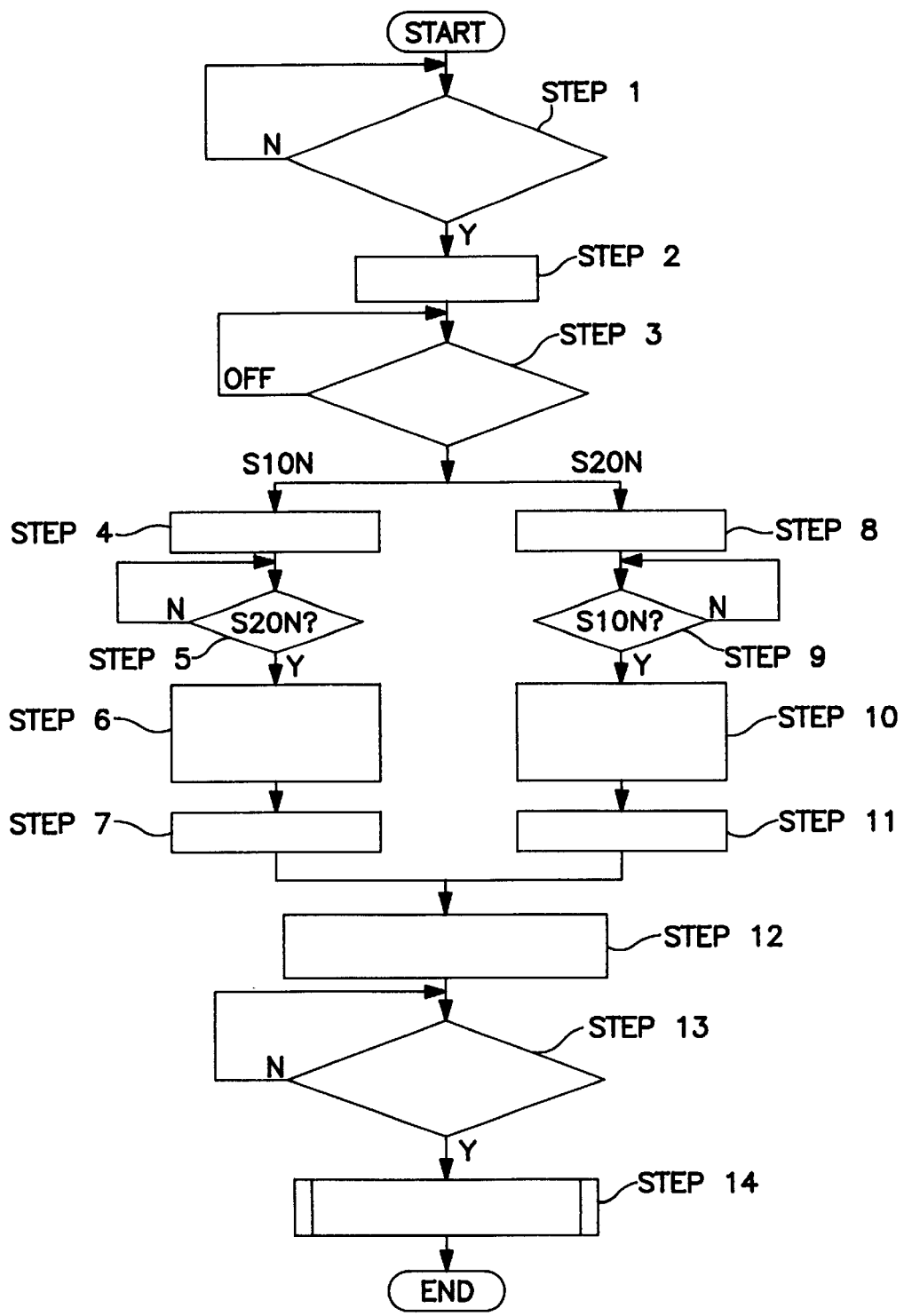
FIG. 9 is a flow chart illustration of first correction.

In FIG. 7, the inclination of the normalized document 30 is ¼ (N=4), and every time the document is conveyed for four lines of scanning, the window signal is moved by the portion of one-clock signal (ΔTS) in the principal scanning direction. In FIG. 8, the document is inclined to the right, and the window signal moves in the opposite direction of FIG. 7. FIG. 9 shows the process of first correction.

(Step 1) The CPU 5 receives a read command.

(Step 2) The CPU 5 sends a convey command to the controller 6, and the conveyor 7 starts to convey the document.

(Step 3) The first inclination sensor (S1) or the second inclination sensor (S2) detects the document and is turned on. Then the S1 is turned on, it means the document is inclined to the left, and when the S2 is turned on, the document is inclined to the right. Suppose the S1 is turned on.

(Step 4) Measurement of distance L2 is started when the S1 is turned on.

(Step 5) The S2 is turned on, and the measurement of distance L2 is over.

(Step 6) The inclination of the document is normalized, and the parameter N is determined.

(Step 7) Along with the conveyance of the document, the window waiting period TS is varied.

(Step 8) through (Step 11) are same as (Step 4) through (Step 7), and the explanations are omitted.

(Step 12) The CPU 5 sends a scan enable signal to the pulse generator 8. The pulse generator 8 sends a scan start signal to the line image sensor 1. The line image sensor 1 starts scanning.

(Step 13) The image signal is corrected, and written into the first memory 13. Consequently, the image signal written in the first memory 13 amounts to K lines.

where K=int(X/N); X is the number of dots in a line.

(Step 14) As explained below, while undergoing second correction, the image signal is transferred from the first memory 13 to the second memory 21.

The image reading apparatus of the invention is intended to present an image signal obtained by scanning in the lateral direction (second direction) of the document. However, since the scanning is fixed in the first direction (the direction orthogonal to the conveying direction), scanning in the second direction is disabled if the document is inclined to the conveying direction.

The second correction explained below is intended to obtain the image signal which might have been obtained by scanning in the second direction, by approximating from the image signal of each sweep for the first direction (the image signal written into the first memory 13). That is, the image reading apparatus of the invention is capable of approximately obtaining the image signal scanned in the lateral direction (the second direction), if the document is inclined, by the first correction and second correction.

Figure 10A:
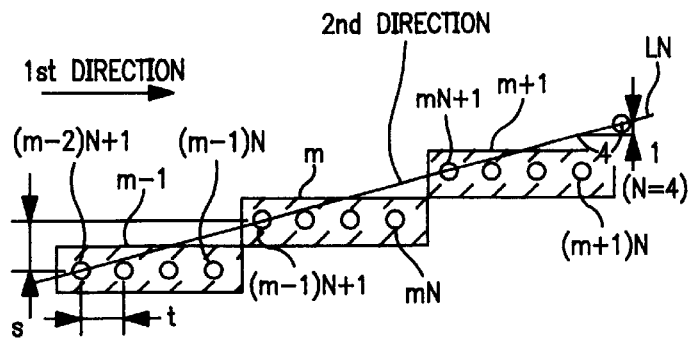
FIGS. 10A–C are diagrams which are useful for explaining second correction.
Figure 10B:
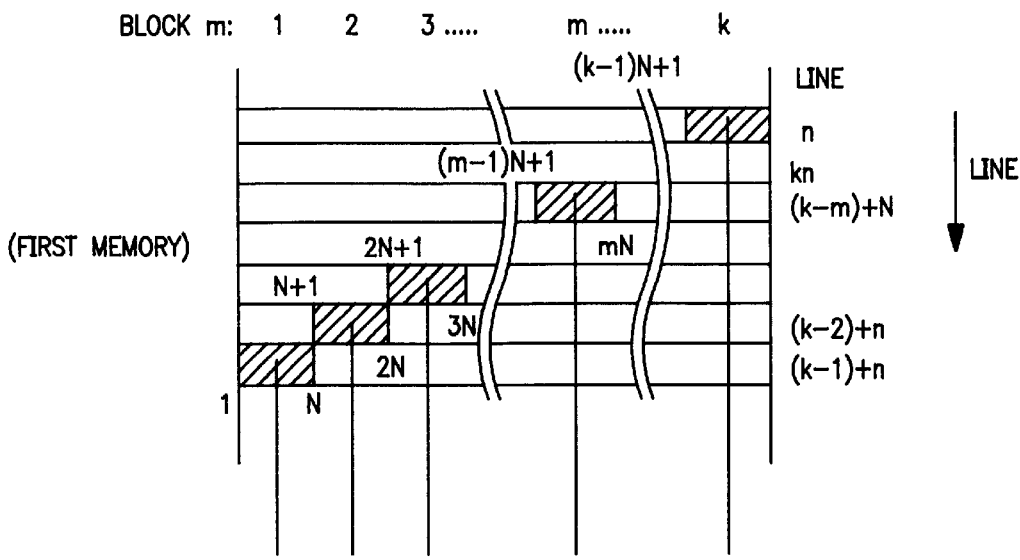
Figure 10C:
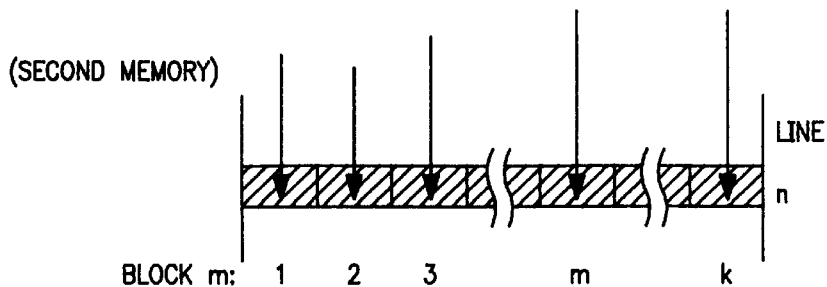

FIGS. 10A–C shows the second correction when the document is inclined to the left. The small circle denotes a dot. LN means the lateral direction of the document, or the second direction, t represents the dot pitch, and s is the line pitch. For the sake of simplicity, in this embodiment, it is supposed t=s. The inclination of the document, that is, the inclination of line LN is ¼.

As shown in FIGS. 10A–C, plural image blocks of block numbers (m−1), m, (m+1) are linked so as to approximate the image signal which might have been obtained if scanned in the second direction LN. Each image signal block is obtained by dividing the image signal of one scanning in the first direction into a plurality.

The image signal blocks for approximating the line LN are stored consecutively in an inclined direction in the first memory 13 as shown in FIG. 10B. By transferring them to the second memory 21 and storing in one row as shown in FIG. 10C, if the document is inclined, the image by scanning the document in the lateral direction can be obtained.

As shown in FIG. 10B, the image signal block of block number m of line n of the second memory 21 corresponds to the image signal block of block number m of line (K−m)+n of the first memory 13. The process of step 14 is to transfer the corresponding image signal block from the first memory 13 to the second memory 21.

Figure 11A:
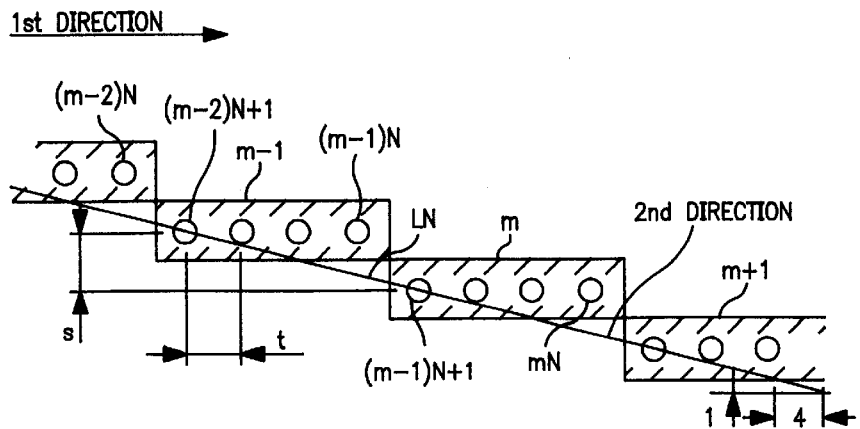
FIGS. 11A–C are further diagrams which are useful for explaining second correction.
Figure 11B:
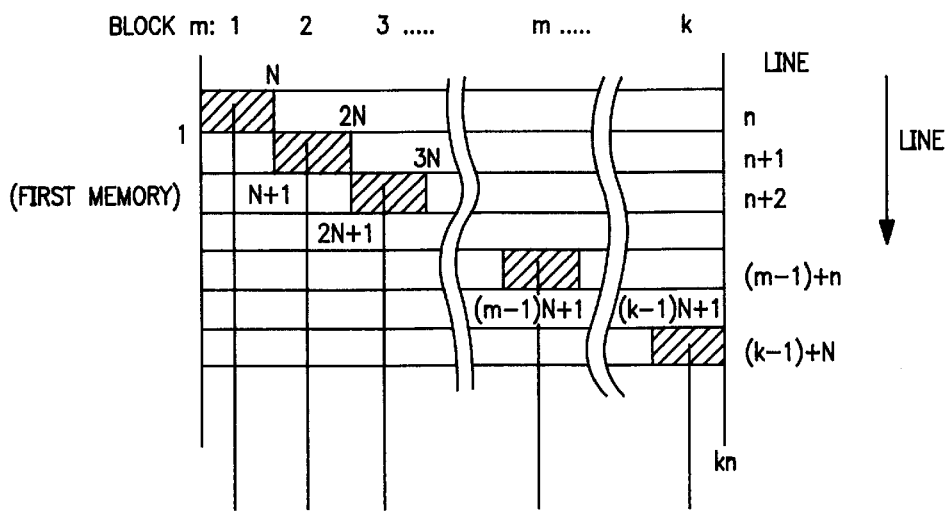
Figure 11C:
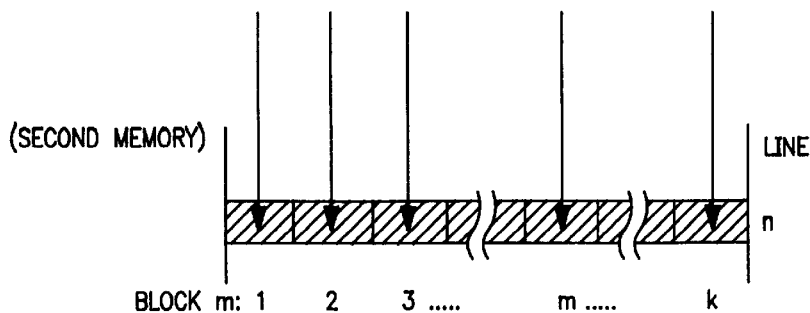
Figure 12:
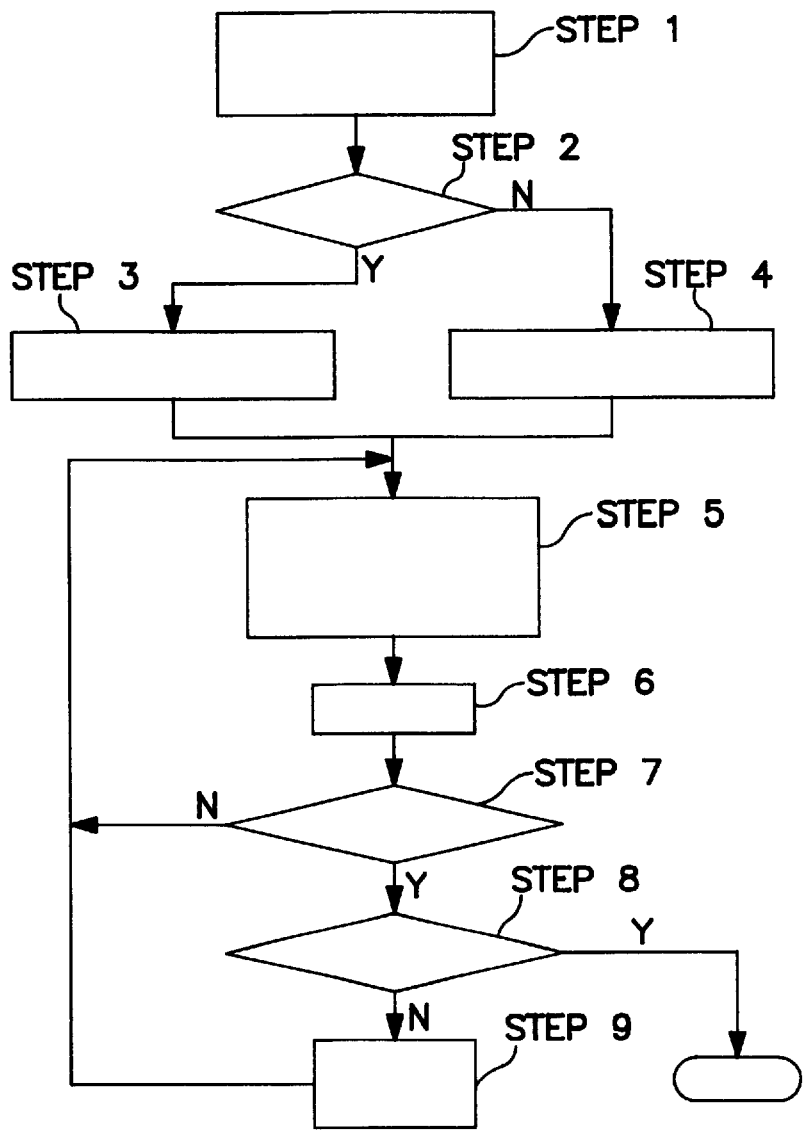
FIG. 12 is a flow chart diagram which is useful for explaining second correction.

FIGS. 11A–C differ from FIGS. 10A–C only in that the document is inclined to the right, and its explanation is omitted herein. FIG. 12 shows the process of the second correction.

(Step 1) Block number m and line number n are initialized.

(Step 2) The document inclination is detected. In this case, the document is supposed to be inclined to the left.

(Step 3) When the block number is m, the reading line of the first memory 13 for transferring to line n of the second memory 21 is supposed to be line (K−m)+n.

(Step 4) Omitted.

(Step 5) The image signal block of block number m is transferred.

(Steps 6, 7) While updating the block number, the same transfer is repeated until the transfer to line n of the second memory 21 is over.

(Steps 8, 9) While updating the line number, the same transfer is repeated until the transfer to all lines of the second memory 21 is over.

Thus, the image reading apparatus of the invention is capable of obtaining a same image signal as when conveyed without inclination, even if the document is conveyed with an inclination, by the first correction and second correction.

What is claimed is:

1. An image reading apparatus for obtaining an approximation of a second image signal representing a document scanned in a second direction, using a first image signal obtained by scanning the document along a scanning line in a first direction, comprising:

means for conveying the document, the document having a leading edge and a tracking edge which define a width, means for detecting an inclination of the conveyed document, means for generating a window signal which defines the portion of the image on the scanning line in the first direction of the image that corresponds to the document, means for forming an image, by scanning the conveyed document in the first direction using a scanning width broader than the width of the document, and reading the scanned image only when the window signal is present, to produce the first image signal, first correcting means for adjusting a start timing of the window signal so that the window signal may be started when the scanning passes the leading edge of the document, with reference to the detected inclination angle of the document, and second correcting means for dividing the first image signal after the adjustment by the first correcting means into a plurality of image signal blocks, linking a plurality of the image signal blocks, and approximating the second image signal which would be obtained if the document were scanned in the second direction.

2. An image reading apparatus of claim 1, further comprising:

a first memory for storing the first image signal after the adjustment by the first correcting means, and a second memory for storing the data of the second image signal after the correction by the second correcting means.

3. A method of image reading for obtaining a second image signal representing a document scanned in a second direction, using a first image signal obtained by scanning the document in a first direction, the method comprising the steps of:

detecting an inclination of a conveyed document, generating a window signal, reading an image by scanning the document in the first direction and reading the scanned image only when the window signal is present for producing the first image signal, correcting a start timing of the window signal with reference to the detected inclination of the document so that the window signal may be started when the scanning passes the beginning of the document, and storing the first image signal after correction in a first memory, and correcting the first image signal in a direction perpendicular to the first direction with reference to the inclination of the document and storing the first image signal after the second correction in a second memory.

4. An image reading apparatus of claim 1, wherein the window signal is generated for a specified period of time.

5. An image reading apparatus of claim 4, wherein the period of the window signal is generated in response to the width of the document.

6. An image reading apparatus of claim 1, further comprising means for generating a variable delay using the detected inclination of the document and wherein the first correcting means adjusts the start timing of the window signal in response to the variable delay.

* * * * *